United States Patent Office

3,321,540
Patented May 23, 1967

3,321,540
PREPARATION OF DIARYLETHYLENE
COMPOUNDS
William J. Trepka, Bartlesville, Okla., assignor to Phillips Petroleum Company, a corporation of Delaware
No Drawing. Filed Sept. 1, 1964, Ser. No. 393,744
13 Claims. (Cl. 260—668)

This invention relates to the production of diarylethylene compounds.

In one of its aspects, the invention relates to the process of making diarylethylene compounds. In another of its aspects, the invention relates to the production of diarylethylene compounds from a reaction in which an organolithium compound is reacted with a mercaptan. Another aspect of this invention relates to a method of reacting organolithium compounds and sulfur-containing compounds to form diarylethylene compounds.

Heretofore, in the production of diarylethylenes, and particularly in the production of stilbene, it has been necessary to heat benzyl mercaptan with a catalyst. Certain metal oxides and sulfides have been employed for this purpose and provision must be made for their removal from the diarylethylene product. Additional production equipment provided for this step adds to operative costs. In another prior art method, diarylethylenes and particularly stilbene, have been made by reacting benzyl chloride and iodized magnesium. However, this method has a disadvantage in that provision must be made for cooling the reactants to control the rate of reaction after it is underway. Further, this reaction has not been indicated to be feasible for large scale production.

I have now invented a new process for the production of diarylethylenes which shows substantial advantages over the prior art methods. It is also within the conception of my invention that reactants which have heretofore not been used in the production of diarylethylenes may be useful in obtaining these compounds.

An object of this invention is the production of diaryl ethenes. A still further object of this invention is to provide a process whereby diarylethylenes may be produced from organolithium compounds. Another object of this invention is to provide a new method for the production of stilbene. Other aspects, objects, and the several advantages of this invention are apparent from a study of this disclosure and appended claims.

According to the invention, there is provided a process for the production of diarylethylenes. Further, according to this invention, there is provided a method for the production of 1,2-diarylethylenes by reacting organolithium compounds and sulfur-containing compounds. These diarylethylenes are produced by reacting an organolithium compound with a benzyl sulfur-containing compound. The benzyl sulfur compound used may be one selected from the group consisting of benzyl mercaptan, dibenzyl sulfide, dibenzyl disulfide, and certain derivatives of these compounds. Of particular interest of the compounds that can be produced in accordance with the practice of this invention is 1,2-diphenylethylene or stilbene as it is commonly known.

Further, in accordance with the practice of this invention, stilbene may be produced by reacting n-butyllithium with benzyl mercaptan or dibenzyl disulfide in a diluent, for example, a hydrocarbon or an ether.

In the practice of this invention, a diarylethylene compound can be prepared by reacting an organolithium compound with a benzyl sulfur-containing compound in a reactor. The reaction can be carried out in the presence of a diluent if desired. If a diluent is used, it can be charged to a reactor which has previously been purged with nitrogen and the particular benzyl sulfur-containing compound is added. The organolithium compound is then introduced. The mixture is then heated to the desired reaction temperature and can be agitated throughout the reaction period. At the conclusion of the reaction, the mixture is hydrolyzed with water or aqueous acid, e.g., a mineral or organic acid such as acetic acid. The aqueous layer is then extracted several times with a compound such as ether, and the resulting extracts combined. The product is then recovered by distillation or evaporation of the diluent.

In the practice of this invention, organolithium compounds employed in the process have the formula $RLi_x$ wherein R is an organic radical selected from the group consisting of aliphatic, cycloaliphatic, and aromatic radicals, and $x$ is an integer from 1 to 4, inclusive. The aliphatic, cycloaliphatic, and aromatic radicals generally contain from 1 to 20 carbon atoms, although it is within the scope of the invention to use compounds containing from 1 to 40 carbon atoms and higher molecular weight compounds. Organolithium compounds preferred, but not limiting the practice of this invention, are those that are hydrocarbon soluble, particularly the alkyllithiums containing from 3 to 10 carbon atoms per molecule.

Illustrative of, but not limiting the organolithium compounds that can be employed in the practice of this invention, are the following:

methyllithium,
ethyllithium,
n-propyllithium,
isopropyllithium,
n-butyllithium,
tert-butyllithium,
isoamyllithium,
n-hexyllithium,
tert-octyllithium,
n-decyllithium,
phenyllithium,
1-naphthyllithium,
2-naphthyllithium,
4-butylphenyllithium,
4-tolyllithium,
4-phenylbutyllithium,
cyclohexyllithium,
1,4-dilithiobutane,
1,10-dilithiodecane,
1,2-dilithio-1,2-diphenylethane,
4-butylcyclohexyllithium,
4-cyclohexylbutyllithium,
1,20-dilithioeicosane,
1,4-dilithiocyclohexane,
1,4-dilithio-2-butene,
1,7-dilithio-3-heptene,
1,8-dilithio-2-decene,
1,4-dilithiobenzene,
1,5-dilithionaphthalene,
1,5-dilithioanthracene,
1,2-dilithio-1,8-diphenyloctane,
1,3,5-trilithiopentane,
1,5,15-trilithioeicosane,
1,3,5-trilithiocyclohexane,
1,2,5-trilithionaphthalene,
1,3,5-trilithioanthracene,
1,3,5,8-tetralithiodecane, and
1,5,10,20-tetralithioeicosane, and the like.

The benzyl-sulfur compounds with which the organolithium compounds are reacted can be represented by the formua:

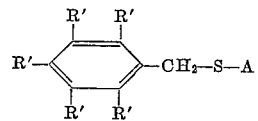

wherein R' is hydrogen or a substituent which does not react with the organolithium compounds, suc as a saturated aliphatic, saturated cycloaliphatic, aromatic, alkoxy, or aryloxy radical; at least two of the R' groups are hydrogen and the total number of carbon atoms in each of the R' groups does not exceed 6, and wherein A is hydrogen or a radical represented by

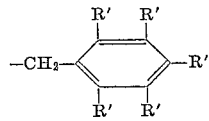

or

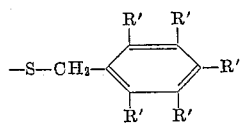

wherein R' is as hereinbefore defined. Examples of compound of this type include, but are not limited to, the following: benzyl mercaptan, 4-methylbenzyl mercaptan, 2,4,6-triethylbenzyl mercaptan, 3,5-di-n-propylbenzyl mercaptan, 4-n-hexylbenzyl mercaptan, 4-cyclohexylbenzyl mercaptan, 2,6-dimethoxybenzyl mercaptan, 4-phenoxybenzyl mercaptan, 4-phenylbenzyl mercaptan, dibenzyl sulfide, bis(4-methylbenzyl) sulfide, bis(2-methyl-4-ethylbenzyl) sulfide, bis(3,5-diethylbenzyl) sulfide, bis(2-methyl-4-ethoxybenzyl) sulfide, bis(3,5-dimethoxybenzyl) sulfide, bis(2,6-diethyl-4-ethoxybenzyl) sulfide, dibenzyl disulfide, bis(4-ethylbenzyl) disulfide, bis(2-methyl-5-n-amylbenzyl) disulfide, bis(4-cyclopentylbenzyl) disulfide, and bis(4-phenoxybenzyl) disulfide.

As hereinbefore described, the reaction can be carried out in the presence of a diluent. Diluents which are suitable in the practice of this invention include, but are not limited to, hydrocarbon diluents such as aliphatic, cycloaliphatic, and aromatic hydrocarbons. Examples of these diluents are: propane, isobutane, n-pentane, isooctane, n-dodecane, cyclopentane, cyclohexane, methylcyclopentane, cyclohexane, methylcyclohexane, benzene, toluene, xylene, and ethylbenzene. The diluent can also be a polar compound such as ethers, including, but not limited to, diethyl ether, diisopropyl ether, dioxane, tetrahydrofuran, and others. The process comprising using mixtures of these polar compounds with each other or with hydrocarbon diluents can also be employed as a part of this invention.

Since the organolithium compound should be preferably soluble in the reaction medium, the choice of this compound will depend to some extent on the particular diluent utilized. Alkyllithium compounds such as butyllithium and other organomonolithium compounds containing from about 3 to 10 carbon atoms per molecule are sufficiently soluble in hydrocarbon diluents as to be operable in systems in which a hydrocarbon is utilized as the reaction medium. Other organolithium compounds that have limited solubility in hydrocarbons but are quite soluble in ethers can be employed when the reaction medium is an ether or an ether-hydrocarbon mixture.

In the practice of the process of this invention, the mol ratio or organolithium to benzyl-sulfur compounds is generally kept in the range of 2:1 to 25:1, however, it is preferably below the ratio 10:1. Because of economical reasons, it is highly desirable to keep the amount of organolithium compound low. When a monolithium compound such as butyllithium is used, optimum results are frequently obtained at mol ratios in the range of about 3:1 to 4:1.

Reaction temperature in accordance with the practice of the method of this invention is generally in the range of about 80 to 200° F. For the reaction to proceed in an optimum manner, however, preferably the temperature range is 100 to 160° F. If desirable, higher or lower temperatures may be used.

Further, in the practice of the process of this invention, reaction time can be varied. Since the reaction as previously indicated is, to some extent, dependent upon the temperature employed, reaction times will vary as the temperature is varied. A suitable time for reaction of the process of this invention has been found to be from about 3 to about 150 hours. However, the most satisfactory results can be obtained at from about 4 to 25 hours.

The process of this invention may be operated either as a batch, a semicontinuous, or a continuous process. The following specific examples are illustrative of a batch process.

Example I

Stilbene was prepared by the reaction of n-butyllithium with benzyl mercaptan in diethyl ether using the following proportions of materials:

| | |
|---|---|
| Benzyl mercaptan, mole | 0.025 |
| Diethyl ether, ml. | 100 |
| n-Butyllithium, mole | 0.083 |
| BuLi/benzyl mercaptan, mole ratio | 3.2/1 |
| Temperature, ° F. | 122 |
| Time, hours | 120 |

The diethyl ether was charged after the reactor had been purged with nitrogen, and benzyl mercaptan was added. The mixture was cooled to ice bath temperature and the n-butyllithium was then introduced as a 2.91 molar solution in heptane. The temperature was adjusted to 122° F. and the mixture agitated throughout the reaction period. It was then poured into an excess of 10 weight percent hydrochloric acid for hydrolysis. The aqueous and organic phases were separated, the aqueous layer was extracted several times with ether, and the several ether layers were combined. This ether solution was washed several times with a total of 100 milliliters of 10 weight percent aqueous sodium hydroxide solution, the ethereal portion was dried over calcium sulfate, and the ether was removed by distillation. A crystalline product suspended in a yellow oil was obtained. It was separated by filtration. After purification by two recrystallizations from ethly alcohol it had a melting point of 121–123° C. A known sample of stilbene had a melting point of 119–123° C. and the melting point of a mixture of the solid reaction product and the known stilbene sample was 120.5–124° C. An infrared method was used for identifying stilbene. The solid reaction product and also a known sample of stilbene were ground with KBr, molded into pellets, and examined by infrared. The infrared spectrum of the solid reaction product was superimposable with that of the known sample of stilbene. The product was therefore identified as stilbene. The yield of crude stilbene was 28.5 weight percent.

Example II

Stilbene was prepared by reacting dibenzyl disulfide with n-butyllithium in diethyl ether. The following proportions of materials were used:

| | |
|---|---|
| Dibenzyl disulfide, mole | 0.025 |
| Diethyl ether, ml. | 100 |
| n-butyllithium, mole | 0.0165 |
| BuLi/dibenzyl disulfide, mole ratio | 6.6/1 |
| Temperature, ° F. | 122 |
| Time, hours | 24 |

The charging procedure was the same as in Example I with dibenzyl disulfide being substituted for benzyl mercaptan. After the materials were charged, the temperature was adjusted to 122° F. and the mixture was agitated throughout the reaction period. It was hydrolyzed by pouring it onto crushed ice acidified with excess hydrochloric acid. The aqueous and organic phases were separated, the aqueous layer was extracted several times with ether, and the several ether layers were combined. This ether solution was washed several times with a total of 100 milliliters of a saturated aqueous solution of sodium carbonate after which it was dried over calcium sulfate. Ether was removed by distillation and a white solid precipitated from the oily residue. Upon recrystallization from ethyl alcohol it had a melting point of 122–125° C. A mixed melting point with a known sample of stilbene gave a value of 123–125° C. The yield of crude stilbene was 26.4 weight percent.

Reasonable variation and modification are possible within the scope of the foregoing disclosure, and the appended claims to the invention, the essence of which is that there has been provided a process for the production of a diarylethylene from an organolithium compound by causing it to react with a benzyl sulfur compound.

I claim:

1. A process for the production of a diarylethylene comprising reacting an organolithium compound having the formula $RLi_x$ wherein R is an organic radical selected from aliphatic, cycloaliphatic, and aromatic radicals, and $x$ is an integer from 1 to 4 with a compound selected from benzyl mercaptan, dibenzyl sulfide, dibenzyl disulfide, and derivatives and mixtures thereof.

2. A process for the production of 1,2-diarylethylene comprising reacting an organolithium compound having the formula $RLi_x$ wherein R is an organic radical selected from aliphatic, cycloaliphatic, and aromatic radicals, and $x$ is an integer from 1 to 4 with a compound selected from the group consisting of benzyl mercaptan, dibenzyl sulfide, dibenzyl disulfide, and derivatives and mixtures thereof, for a time sufficient to complete the reaction.

3. A process for the production of 1,2-diarylethylenes comprising reacting an organolithium compound having the formula $RLi_x$ wherein R is an organic radical selected from aliphatic, cycloaliphatic, and aromatic radicals, and $x$ is an integer from 1 to 4 with a compound selected from the group consisting of benzyl mercaptan, dibenzyl sulfide, dibenzyl disulfide, and derivatives and mixtures thereof, for a time sufficient to complete the reaction, and hydrolyzing the reaction mixture.

4. A process for the production of stilbene comprising reacting n-butyllithium with benzyl mercaptan.

5. A process for the production of stilbene comprising reacting dibenzyl disulfide with n-butyllithium.

6. A process for the production of stilbene comprising reacting n-butyllithium with a compound selected from the group consisting of benzyl mercaptan and dibenzyl sulfide.

7. A process for the production of 1,2-diarylethylene comprising reacting an organolithium compound having the formula $RLi_x$ wherein R is an organic radical selected from aliphatic, cycloaliphatic, and aromatic radicals, and $x$ is an integer from 1 to 4 with a compound selected from the group consisting of benzyl mercaptan, dibenzyl sulfide, dibenzyl disulfide, and derivatives thereof, for a time sufficient to complete the reaction, and hydrolyzing the reaction mixture with water or aqueous acid.

8. A process for the production of 1,2-diarylethylene comprising reacting an organolithium compound having the formula $RLi_x$ wherein R is an organic radical selected from aliphatic, cycloaliphatic, and aromatic radicals, and $x$ is an integer from 1 to 4 with a compound selected from the group consisting of benzyl mercaptan, dibenzyl sulfide, dibenzyl disulfide, and derivatives thereof, said reaction being carried out at a temperature in the range of about 80 to 200° F. and in a time period from about 3 to 150 hours, the ratio of the reactant products being in the range of 2:1 to 25:1, organolithium compound to benzyl sulfur compound.

9. A process for the production of 1,2-diarylethylene comprising reacting an organolithium compound having the formula $RLi_x$ wherein R is an organic radical selected from aliphatic, cycloaliphatic, and aromatic radicals, and $x$ is an integer from 1 to 4 with a compound selected from the group consisting of benzyl mercaptan, dibenzyl sulfide, dibenzyl disulfide and derivatives thereof, said reactants being in a range below 10:1, and the temperature at which said reaction occurs being in the range of 100 to 160° F., said reaction time being from 4 to 25 hours.

10. A process for the production of stilbene comprising reacting n-butyllithium with benzyl mercaptan in diethyl ether, the mole ratio of n-butyllithium to benzyl mercaptan being about 3.2:1 and said reaction being carried out at a temperature of about 120° F. for a period of time of about 120 hours.

11. A process for the production of stilbene comprising reacting dibenzyl disulfide with n-butyllithium in diethyl ether, the mole ratio of n-butyllithium to benzyl mercaptan being about 6.6:1 and said reaction being carried out at a temperature of about 120° F. for a period of time of about 24 hours.

12. A process for the production of stilbene comprising reacting n-butyllithium with benzyl mercaptan in diethyl ether, heating the reaction mixture to about 120° F., agitating the reaction mixture, hydrolyzing the reaction mixture, extracting the aqueous phase of the reaction mixture with ether, removing the ether by distillation, crystallizing the stilbene from the resulting concentrate and separating the stilbene by filtration.

13. A process for the production of diaryl alkenes comprising reacting an organolithium compound having the formula $RLi_x$ wherein R is an organic radical selected from aliphatic, cycloaliphatic, and aromatic radicals, and $x$ is an integer from 1 to 4 with a compound represented by the formula

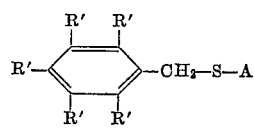

wherein each R' is selected from hydrogen saturated aliphatic, saturated cycloaliphatic, aromatic, alkoxy and aryloxy radicals, and where at least two of the R' groups are hydrogen and the total number of carbon atoms in each of the substituents does not exceed 6; and A is selected from hydrogen

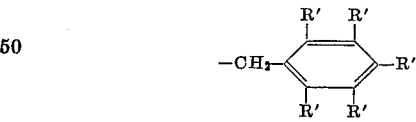

and

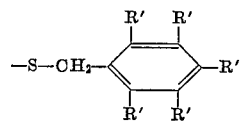

wherein R' is as hereinbefore defined.

References Cited by the Examiner

UNITED STATES PATENTS 2,645,671   7/1953   Mattano _____ 260—668
3,254,131   5/1966   Landis _____ 260—668 X DELBERT E. GANTZ, *Primary Examiner.*

C. R. DAVIS, *Assistant Examiner.*